(12) United States Patent
Corwith

(10) Patent No.: US 6,259,778 B1
(45) Date of Patent: Jul. 10, 2001

(54) METHOD AND APPARATUS FOR DETECTING MODEM TONES FOR IMPLEMENTATION OF A DIFFERENT BILLING STRUCTURE FOR MODEM CALLS

(75) Inventor: John T. Corwith, West Chicago, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/016,237

(22) Filed: Jan. 30, 1998

(51) Int. Cl.[7] .................... H04M 15/00; H04M 11/00; G06F 17/60
(52) U.S. Cl. ............... 379/115; 379/100.04; 379/114; 379/126; 705/400
(58) Field of Search ................... 379/111, 113, 379/114, 115, 121, 124, 126, 134, 137, 100.01, 100.04, 93.14; 704/400

(56) References Cited

U.S. PATENT DOCUMENTS

| | | | |
|---|---|---|---|
| 5,790,642 | * | 8/1998 | Taylor et al. .................... 379/112 |
| 5,835,240 | * | 11/1998 | Kobayashi et al. .................... 358/468 |
| 5,898,763 | * | 4/1999 | Azuma et al. .................... 379/100.04 |
| 5,905,785 | * | 5/1999 | Dunn et al. .................... 379/113 |
| 5,946,670 | * | 8/1999 | Motohashi et al. .................... 379/114 |
| 6,088,687 | * | 7/2000 | Leleu .................... 705/400 |

* cited by examiner

Primary Examiner—Stella Woo
Assistant Examiner—Binh K. Tieu

(57) ABSTRACT

This invention provides telecommunication companies and operators of private branch exchanges (PBXs) with the ability to detect the use of modem calls and bill the user accordingly. By detecting a modem call, the telecommunication company and PBX operator can bill the modem call differently than a voice call. Billing rate structure plans can be created based on the connection time of the modem call, the number of bits transferred during the modem connection, or a combination of both connection time and number of bits transferred.

10 Claims, 3 Drawing Sheets

METHOD AND APPARATUS FOR DETECTING MODEM TONES FOR IMPLEMENTATION OF A DIFFERENT BILLING STRUCTURE FOR MODEM CALLS

FIELD OF THE INVENTION

This invention relates to a method for detecting modem tones in a central office or a PBX system so that a different billing structure can be established for the call so that the network resources supporting the call are more favorably experienced to those users occupying the most resources.

BACKGROUND

A rising problem and also opportunity for telecommunication companies today is the increased use of data transmissions primarily through customer use of the Internet. In addition, business customers are increasingly using the Internet or company Intranets for communication, access and transfer of data. While this increased level of activity provides increased business opportunities for the telecommunication companies, unfortunately a significant part of this activity tied up local resources for long periods of time using low margin billing structures.

Unlike the majority of voice telephone calls, the majority of modem calls accessing an Internet service provider's point-of-presence or an Intranet's point-of-presence often last hours. In addition, in some instances the line connecting the modem with the Internet service provider is maintained for hours, often with the transmission of little if any data. Many Internet service provides automatically disconnect users if the resources are not used after a specific period (usually 15 to 20 minutes).

The major problem is resource utilization of analog lines. Where as digital modems packetized data and share switching resources, analog modems tie up the same resources as an analog voice call. The switch must allocate a time slice to the call and resources are used whether data is being exchanged, or the user is off getting a donut. Many users dial up their Internet service first thing in the morning and don't disconnect until late at night. This type of usage can cause a shortage of resources for analog voice calls. Telecommunication companies are forced to add resources to handle the additional traffic load while the revenue collected from customers using these resources is treated as a voice analog call.

This problem also exists in hotels catering to business travelers. Valuable private branch exchange resources are tied up catering to business travelers who are accessing the Internet or their company's Intranet. In most major hotels, local calls either are free or require a nominal charge of less than one dollar. While most local hotel calls last less than ten minutes, the same local modem calls to a customer's Internet service provider last significantly longer. However, while the hotel receives the same revenue for each call, the hotel must support a larger private branch exchange (PBX) system to support customer making modem calls several lasting hours.

A need exists for telecommunication companies to recognize the incoming call as a modem call and route billing messages so that the customer is billed at a rate that differs from local traffic. In addition, operators of private branch exchanges also need to recognize modem calls from local calls, where in certain locations such as hotel operations, new sources of revenue can be obtained from customers.

SUMMARY

This invention provides telecommunication companies with the ability to detect the use of modem calls and bill the user accordingly. Many telecommunication companies currently bill in bands with the smallest band being charged as a fixed call. Internet service providers (ISPs) take advantage of this banding and provide customers with "local points of presents (local POPs)" sites which are local numbers which can be used to dial up their service at the fixed call rate. While a modem call's connection time might be several hours, it is billed the same a local call that uses the same communication resources for a significantly shorter time period.

By detecting a modem call, the telecommunication company can bill the modem call differently than a voice call. The telecommunication company can create a variety of billing rate structure plans based on the time a modem user needs the connection resources, the amount of traffic between the POP, or a combination of both time of occupying the resources and amount of traffic.

BRIEF DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DETAILED DESCRIPTION OF PREFERRED EMBODIMENTS

Figure 1:
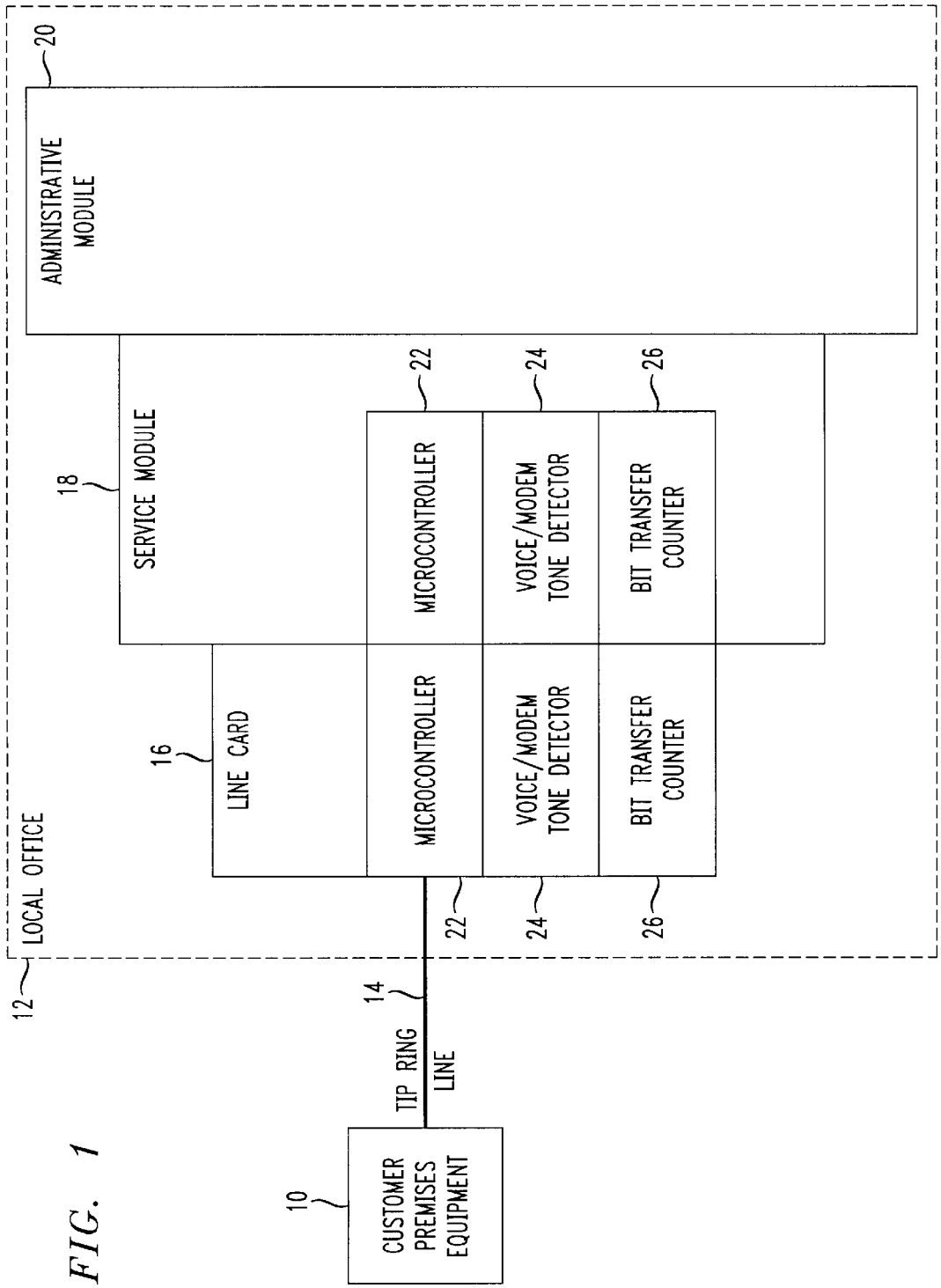
FIG. 1 illustrates a block diagram of a CPU/Controller with a voice/modem tone detector in the line card of a telecommunication switch.

FIG. 1 illustrates a block diagram of a microcontroller with a voice/modem tone detector in the line card of a telecommunication switch. When a connection is desired, a signal is sent from a customer premises equipment 10 to a central or local office 12 via a tip ring line (often a twisted pair line) 14. At the local office 12, the tip ring line 14 is connected to a line card 16 that interfaces with a service module 18. The service module 18 interfaces with an administrative module 20 that performs the routing of calls. This description is a simplified version of how the typical customer premises equipment 10 is connected to a local office 12.

This invention provides a microcontroller 22 for the detecting the tone signals coming from the customer premises equipment 10. The microcontroller 22 is located a the point of concentration so that each available twisted pair interface with the switch (typically 50% of the overall number of lines coming into the local office 12), can be detected for modem tones. Therefore, it is possible to locate the microcontroller 22 at the line card or in the service module. Within the microcontroller 22, is a voice/modem tone detector 24 and a bit transfer detector 26 that is activated if the signal received by the microcontroller 22 is determined to be a modem call. Like the microcontroller 22, both the voice/modem tone detector 24 and the bit transfer counter 26 are capable of being located in either the line card 16 or the service module 18.

Figure 2:
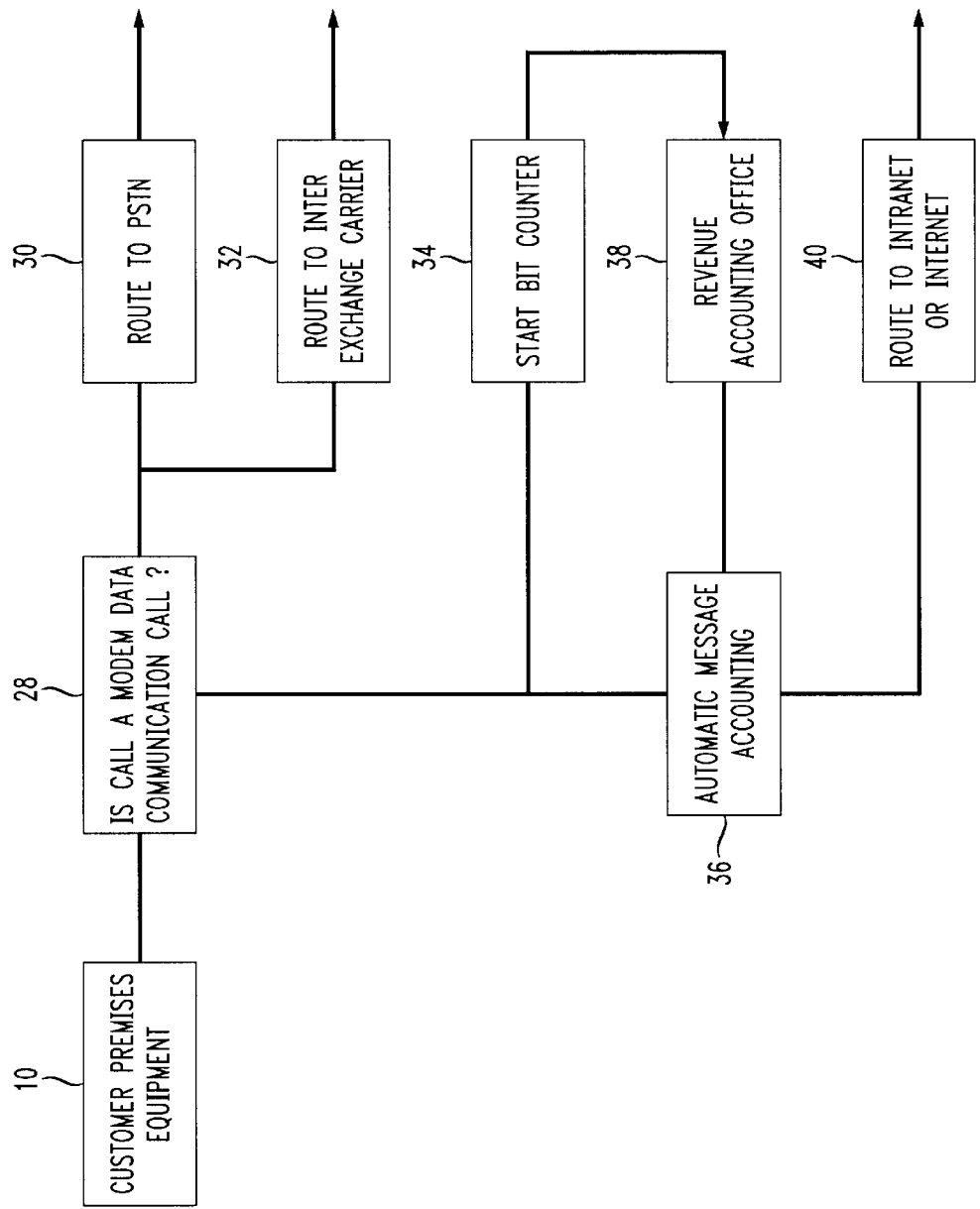
FIG. 2 illustrates a message flow diagram for detecting modem calls and the routing of messages for data transfer billing rates.

FIG. 2 illustrates a message flow diagram for detecting modem calls and the routing of messages for data transfer billing rates. When a call is initiated by the customer premises equipment 10, the signal is detected by the microcontroller 22 and performs the query 28. If the call is a voice call, it is routed and handled in the current scheme by sending the call to the public switched telephone network (PSTN) 30 or to the interexchange carrier 32 if the call is an InterLATA call. However, if the call is a modem call, the microcontroller 22 initiates a bit counter 34 and sends a message to the automatic message accounting 36.

The automatic message accounting equipment 36 provides a means for recording accounting data on calls originating through the local office 12. Each customer is automatically identified when the call is connected. The automatic message accounting feature 36 records the calling party's number, the called number, and the answer and disconnect times. The automatic message accounting feature 36 teleprocessing forwards call billing information to the centralized automatic message accounting data collection system. The collection system in turn interfaces with the revenue accounting office 38 that processes the billing information. The modem call is then routed to the local Internet point-of-presence (POP) 40.

Billing for the modem call can be based on the time of the connection or the amount of information transferred during the connection. Often modem calls involve a connection to switching resources for long period of time, in which very little information is transmitted over the connection. In other cases, the large quantities of information are transferred. Telecommunication companies can offer customized billing plans to users employing modem calls to recover their investment in switching resources that are needed to support the large and increasing volume of modem calls.

Figure 3:
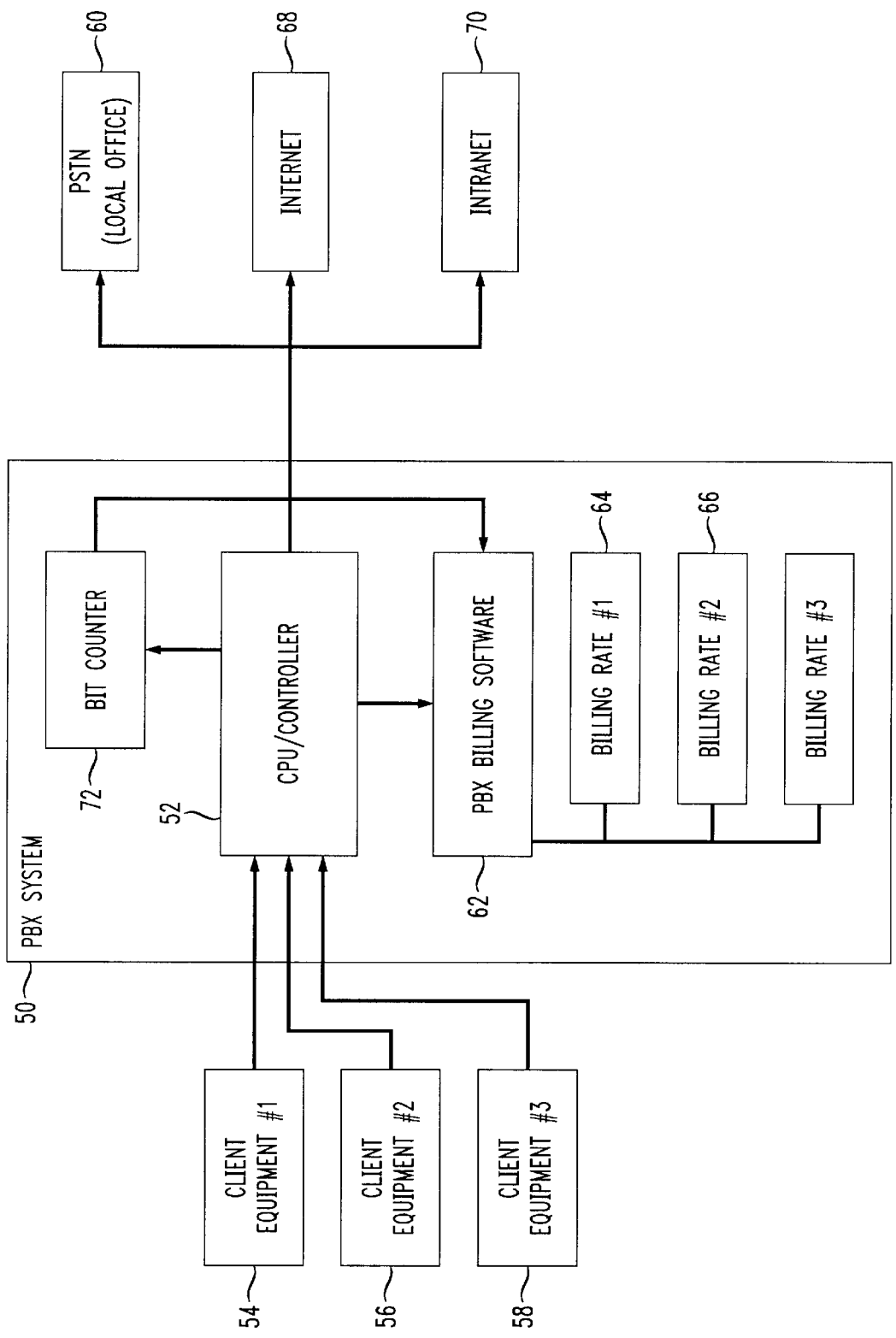
FIG. 3 illustrates a message flow diagram for detecting modem calls and the routing of messages for data transfer billing rates in private branch exchange systems.

If the telecommunication companies implement similar plans and bill businesses based on these billing schemes, certain businesses such as hotels will need real time modem call tracking information to insure that the hotel's customers are appropriately billed for the services used. FIG. 3 illustrates a message flow diagram for detecting modem calls and the routing of messages for data transfer billing rates in private branch exchange systems. The private branch exchange (PBX) system 50 contains a CPU/Controller 52 capable of detecting whether incoming calls from client equipment 54, 56, 58 are voice calls or modem calls. If the incoming calls are voice calls, the CPU/Controller 52 routes the calls to the public switched telephone network 60. When the call is routed by the CPU/Controller 52, a message is generated and sent to the PBX call accounting system (PBX billing software) 62. For local calls, billing rate # (64), could be used. For long distance calls, another billing rate 66 could be used to reflect the higher costs that will be billed to the PBX operator by the interexchange carrier.

If the CPU/Controller 52 detects the incoming call as a modem call, the incoming call is routed to an Internet service provider's point-of-presence 68 or an Intranet point-of-presence 70. When the incoming modem call is detected, the CPU/Controller 52 transmits a signal to a bit counter 72 that records the number of bits transferred during the modem call's connection. At the termination of the modem call connection, the number of bits transferred is sent to the PBX call accounting system (PBX billing software) 62. PBX call accounting system 62 includes a station message detail register that is capable of receiving call details at the termination of each call. These call details are transferred to the PBX call accounting system 62 for billing purposes. The PBX's call accounting system 62 couples the calling details such as the calling number, called number and length of the call to various billing schemes. The PBX call accounting system 62 can implement a variety of billing schemes according to the length of time of the modem connection, the number of bits transferred during the modem connection or a hybrid scheme billing both connection time and the number of bits transferred.

While exemplary systems and methods embodying the present invention are shown by way of example, it will be understood, of course, that the invention is not limited to these embodiments. Modifications may be made by those skilled in the art, particularly in light of this disclosure. For example, each of the elements of the disclosed embodiments may be utilized alone or in combination with elements of the other embodiments.

We claim:

1. A method for detecting modem tones for implementing a billing scheme, comprising the steps of:
   receiving at a local office a signal transmitted from a customer premises equipment;
   analyzing the signal by examining the signal's tones to determine whether the signal is voice or modem call;
   if the signal is a voice call, routing the signal to a public switched telephone network;
   if the signal is a modem call, routing a first billing message to an automatic message accounting equipment;
   routing the signal to a point-of-presence for a modem connection;
   counting in a line card at the local office a number of bits transferred during the modem connection; and
   routing a second billing message with the number of bits transferred to the automatic message accounting equipment.

2. The method for detecting modem tones for implementing a billing scheme of claim 1, where the point-of-presence is an Internet connection.

3. The method for detecting modem tones for implementing a billing scheme of claim 1, where the point-of-presence is an Intranet connection.

4. A method for billing modem calls in a private branch exchange, comprising the steps of:
   receiving a call at a private branch exchange system;
   determining whether the call is a voice call or modem call by a controller and routing the voice call to a public switched telephone network for establishing a voice connection and routing the modem call to a point-of-presence for establishing a modem connection;
   sending a first message from the controller to the private branch exchange system call accounting system containing billing information distinguishing between voice calls and modem calls; and
   sending a second message from the controller to a bit counter located on a line card capable of tracking the number of bits transferred during the modem connection.

5. The method for billing modem calls in a private branch exchange, of claim 4 further comprising the steps of:
   after receiving the first message from the controller, the call accounting system implements a billing scheme based on the length of time of the modem connection if the first message indicates the modem call.

6. The method for billing modem calls in a private branch exchange, of claim 4 further comprising the steps of:
   transmitting a third message from the bit counter to the private branch exchange system call accounting system at the termination of the modem connection containing information regarding the number of bits transferred during the modem connection.

7. The method for billing modem calls in a private branch exchange, of claim 6 further comprising the steps of:

receiving the third message at the private branch exchange system call accounting system containing information regarding the number of bits transferred during the modem connection; and implementing a billing scheme for the modem connection based on the number of bits transferred.

8. The method for billing modem calls in a private branch exchange, of claim 6 further comprising the steps of:

receiving the third message at the private branch exchange system call accounting system containing information regarding the number of bits transferred during the modem connection; and implementing a billing scheme for the modem connection based on the number of bits transferred and the length of time of the modem connection.

9. An apparatus for implementing a billing scheme for modem calls, comprising:

means for determining whether an incoming call at a local office is a voice or a modem call;

means for routing the incoming call to a public switched telephone network if the incoming call is voice and to a point-of-presence if the incoming call is modem;

means for transmitting a message to an automatic message accounting equipment;

means for implementing a bit counter on a line card for tracking the number of bits transferred during the modem connection and means for transmitting the number of bits transferred during the modem connection to the automatic message accounting equipment; and means for implementing different billing schemes in the automatic message accounting equipment based on whether the incoming call was voice or modem.

10. The apparatus for implementing a billing scheme for modem calls of claim 9, where the means for determining whether an incoming call at a local office is a voice or modem call is a controller.

* * * * *